United States Patent [19]
Lee

[11] Patent Number: 6,052,104
[45] Date of Patent: Apr. 18, 2000

[54] STRUCTURE AND OPERATION METHOD OF LCD

[75] Inventor: Hyun Chang Lee, Seoul, Rep. of Korea

[73] Assignee: LG Electronics Inc., Seoul, Rep. of Korea

[21] Appl. No.: 08/564,810

[22] Filed: Nov. 29, 1995

[30] Foreign Application Priority Data

Jul. 12, 1995 [KR] Rep. of Korea ................. 95-20479

[51] Int. Cl.⁷ ................................................ G09G 3/36
[52] U.S. Cl. ................................................ 345/92
[58] Field of Search ...................... 345/92, 87, 88, 345/94, 98, 93, 100, 96, 91; 349/43, 44, 42, 110, 111, 139, 147, 48, 47; 359/59

[56] References Cited

U.S. PATENT DOCUMENTS

| | | | |
|---|---|---|---|
| 4,789,223 | 12/1988 | Kasahara et al. | 345/87 |
| 4,930,874 | 6/1990 | Mitsummune et al. | 345/92 |
| 4,948,231 | 8/1990 | Aoki et al. | 349/44 |
| 5,193,017 | 3/1993 | Iwai et al. | 349/43 |
| 5,194,974 | 3/1993 | Hamada et al. | 359/59 |
| 5,300,945 | 4/1994 | Iemoto et al. | 345/92 |
| 5,331,447 | 7/1994 | Someya et al. | 349/42 |
| 5,432,527 | 7/1995 | Yanai et al. | 345/87 |
| 5,448,384 | 9/1995 | Uchino et al. | 359/59 |
| 5,598,180 | 1/1997 | Suzuki et al. | 345/97 |
| 5,650,834 | 7/1997 | Nakagawa et al. | 349/139 |
| 5,774,099 | 6/1998 | Iwasaki et al. | 345/87 |

FOREIGN PATENT DOCUMENTS

| | | |
|---|---|---|
| 0 224 388 | 6/1987 | European Pat. Off. . |
| 0 622 655 | 11/1994 | European Pat. Off. . |
| 62-123427 | 6/1987 | Japan . |
| 2-298915 | 2/1990 | Japan . |
| 4-12319 | 1/1992 | Japan . |
| 5-107555 | 4/1993 | Japan . |
| 5-107557 | 4/1993 | Japan . |
| 5-173175 | 7/1993 | Japan . |
| 5-224235 | 9/1993 | Japan . |
| 5-241124 | 9/1993 | Japan . |
| 5-341729 | 12/1993 | Japan . |
| 6-186592 | 7/1994 | Japan . |
| 6-202157 | 7/1994 | Japan . |
| 7-230075 | 8/1995 | Japan . |

*Primary Examiner*—Jeffery Brier
*Attorney, Agent, or Firm*—Finnegan, Henderson, Farabow, Garrett & Dunner, L.L.P.

[57] ABSTRACT

A liquid crystal display comprises a first substrate, a second substrate, and liquid crystal material disposed between the first and second substrates. The first substrate includes a plurality of gate lines and data lines, thin film transistors for switching pixels, and pixel electrodes, arranged thereon. The second substrate includes common electrodes formed identically to the gate lines in number and also classified by line, a plurality of switching elements for switching a common voltage to the common electrodes, and a common voltage floating signal driver for applying floating pulses to each of the switching elements. The method for operating this liquid crystal display includes applying a common voltage to each of common electrodes at a rising edge of a gate signal pulse of the line and cutting the gate signal pulse immediately prior to a falling edge of the gate signal pulse.

4 Claims, 5 Drawing Sheets

STRUCTURE AND OPERATION METHOD OF LCD

BACKGROUND OF THE INVENTION

This invention relates to a liquid crystal display, and more particularly to a liquid crystal display and a method for operating the liquid crystal display, which can improve the picture quality by reducing voltage variation of pixel electrodes due to both a parasitic capacitor between a gate electrode and a source electrode of a thin film transistor that operates each pixel and a leakage current of the transistor.

A conventional active matrix type liquid crystal display includes an underside plate having transistors for switching pixels and pixel electrodes arranged thereon, an upperside plate having color filters for filtering color, a common electrode, liquid crystal filled between the underside and upperside plates, and two polarizing plates attached on outer sides of the underside and upperside plates for linear polarization of visible lights.

The conventional liquid crystal display will be explained hereinafter, with reference to the attached drawings.

FIG. 1 is an equivalent circuit of the conventional liquid crystal display. FIG. 2 shows a voltage characteristic curve of a pixel electrode of the conventional liquid crystal display shown in FIG. 1. FIG. 3 is an equivalent circuit of a unit pixel region of the conventional liquid crystal display shown in FIG. 1.

The conventional liquid crystal display includes a plurality of gate lines $N_1$ to $N_n$ arranged in one direction each spaced apart from one another by a fixed interval, a plurality of data lines $D_1$ to $D_n$ arranged in a direction orthogonal to the gate lines each spaced apart from one another by another fixed interval, and a plurality of unit pixel regions each formed within a space region at the intersections of the gate lines $N_1$ to $N_n$ and the data lines $D_1$ to $D_n$.

Each of the unit pixel regions includes a pixel electrode (not shown) and a thin film transistor 10 having a gate electrode 18 connected to a gate line, a drain electrode connected to the data line, and a source electrode 22 connected to the pixel electrode, for applying data signals to the pixel electrode.

The unit pixel region also includes a stacked type capacitor $C_{ST}$ and a liquid crystal capacitor $C_{LC}$, as seen in FIG. 3. $C_{ST}$ exists between the pixel electrode and the adjacent gate line and compensates for the leakage of applied data signal charges. $C_{LC}$ results from the pixel electrode on the underside plate and a common electrode 24 (FIG. 1) on the upper plate.

The common electrodes 24 are integrated into a single electrode on the upperside plate and, though not shown, the gate lines $N_1$ to $N_n$ and the data lines $D_1$ to $D_n$ are connected to a gate operating IC and data operating IC, respectively, and are operated by each of the respective IC's.

Operation of the conventional liquid crystal display having the foregoing system will be explained as follows.

Upon sequential application of gate operation pulses to each of the gate lines N1 to $N_n$ by the gate operation IC, each of the thin film transistors 10 having the gate operation pulses (voltage) applied thereto is turned on. During the time the thin film transistor 10 is turned on, the pixel 5 displays the image signals based on data voltages, containing image information, that are applied from the data operation IC to the liquid crystal through the thin film transistors 10 via the data lines $D_1$ to $D_n$.

At this time, common voltage $V_{COM}$ is applied to the common electrode 24 where the common voltage $V_{COM}$ is alternating or direct voltage which is a central value for a pixel electrode swing. As used in this disclosure, pixel electrode swing is the periodic alternations of the pixel electrode voltage between a high and a low voltage as compared to the voltage of the common electrode. Pixel electrode swing is used to prevent damage to the liquid crystal that would occur if a constant high or low voltage were applied.

When the common voltage and gate operation voltages are applied, the thin film transistor, turned on when the gate operation pulse is rising, charges the capacitors $C_{ST}$ and $C_{LC}$ with the data voltage. This charged voltage is maintained until the next field, even if the thin film transistor is turned off at the termination of the gate operation pulse.

However, the conventional liquid crystal display experiences problems as described below.

Since the described thin film transistor 10 has the gate electrode 18 overlapping the source electrodes 22 and drain electrodes 20, with the parasitic capacitors $C_{gs}$ and $C_{gd}$ formed between them, the pixel voltage drops $\Delta V_p$ (FIG. 2) because of the capacitive coupling when the thin film transistor is turned off the termination of the gate operation pulse.

That is, as shown in FIG. 3, when the operating pulse on $n^{th}$ gate line is dropping (e.g., when the gate operating pulse is changing from 15 V to −10 V) at 0 V of common voltage, and 5 V data voltage is charged in the pixel electrode, voltage to both ends of a parasitic capacitance $C_{gs}$ (formed by the gate electrode and the source electrode) has a change of 25 V. This change of voltage at both ends of the $C_{gs}$, compensated with the capacitors $C_{ST}$ and $C_{LC}$, drops the voltage of the pixel electrode by a value $\Delta V_p$.

This drop in voltage results in crosstalk on the visual display. Crosstalk may occur when a window pattern is to be displayed by charging a line from which the window pattern starts. Since a parasitic capacitance is formed between the data line and the common electrode and the pixel electrode voltage drops by $\Delta V_p$, the pixel cannot have exact data voltage charged therein.

This voltage drop at the pixel electrode degrades the picture quality because the voltage drop causes flicker of images and affects the common voltage terminal on displaying the window pattern to cause a phenomenon in which a grey scale of the image is changed (horizontal cross talk) until the voltage on the common voltage terminal is stabilized.

SUMMARY OF THE INVENTION

The object of this invention is to solve the foregoing problems by providing a liquid crystal display and a method for operating the liquid crystal display, which can provide good picture quality by preventing voltage variations on the pixel electrodes.

These and other objects and features of this invention can be achieved by providing a liquid crystal display, comprising: a first substrate having a plurality of gate lines, data lines, thin film transistors, and pixel electrodes arranged thereon; a second substrate having common electrodes formed identical in number to the gate lines and classified by line; liquid crystal material filled between the first and the second substrates; and a plurality of switching elements each provided at each of said common electrodes for switching a common voltage to said common electrodes.

These and other objects and features of this invention can also be achieved by providing a method for operating a liquid crystal display, said liquid crystal display including a plurality of common electrodes classified by line, the method including the steps of: applying a common voltage to each of common electrodes at a leading edge of a gate signal pulse of the line; and cutting the gate signal pulse immediately prior to a trailing edge of the gate signal pulse.

In addition, a method is provided for operating a liquid crystal display including a plurality of common electrodes identical in number to gate lines and classified by line. The method includes the steps of: connecting a common voltage source to one of said common electrodes corresponding to a gate line having a gate signal pulse applied thereto; and electrically isolating said one of said common electrodes immediately prior to a falling edge of said gate signal pulse.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE INVENTION

This invention will be explained in more detail hereinafter, with reference to the attached drawings.

Figure 1:
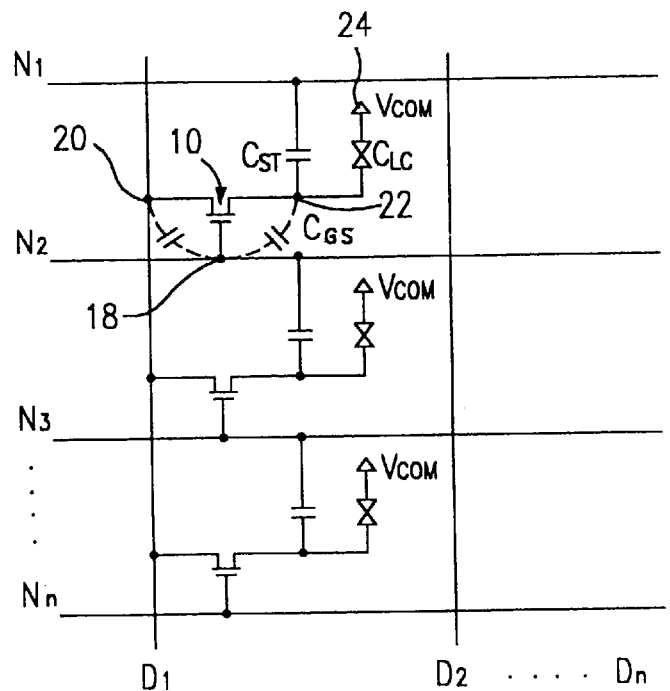
FIG. 1 is an equivalent circuit diagram of part of a conventional liquid crystal display.
Figure 2:
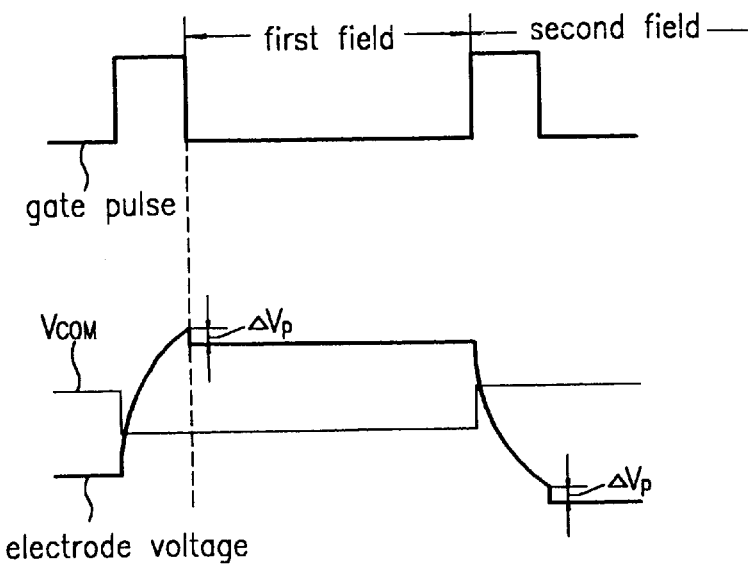
FIG. 2 shows voltage characteristic curves of a pixel electrode voltage of the conventional liquid crystal display shown in FIG. 1.
Figure 3:
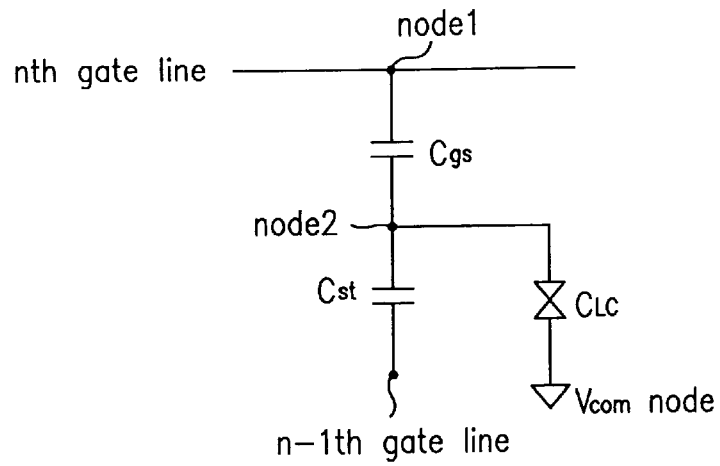
FIG. 3 is an equivalent circuit diagram of a unit pixel region of the conventional liquid crystal display shown in FIG. 1.
Figure 4:
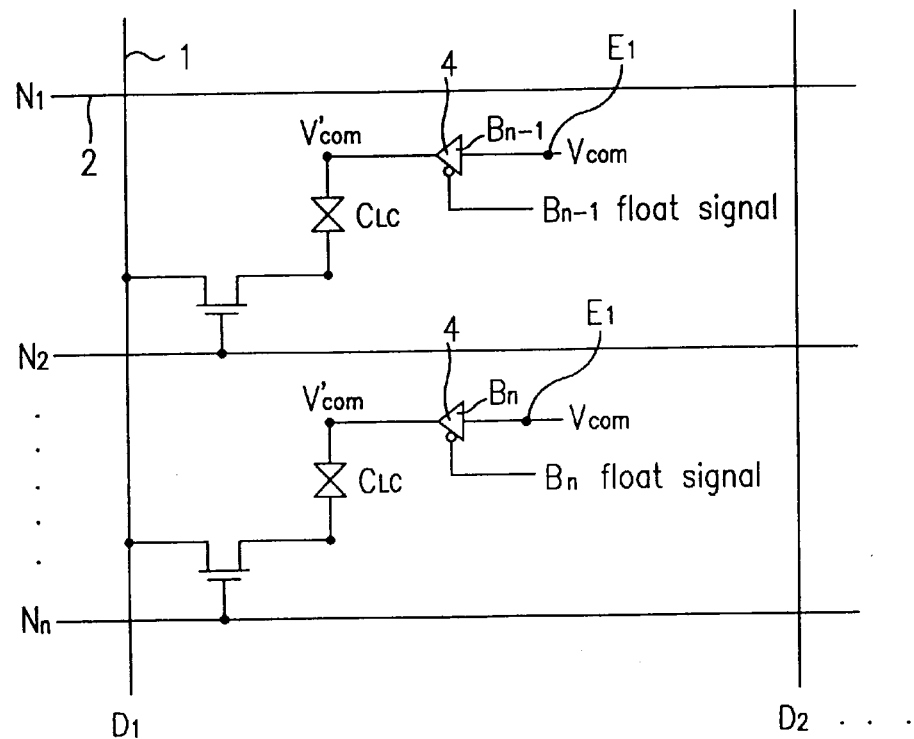
FIG. 4 is an circuit diagram of a liquid crystal display in accordance with a first embodiment of this invention.
Figure 5:
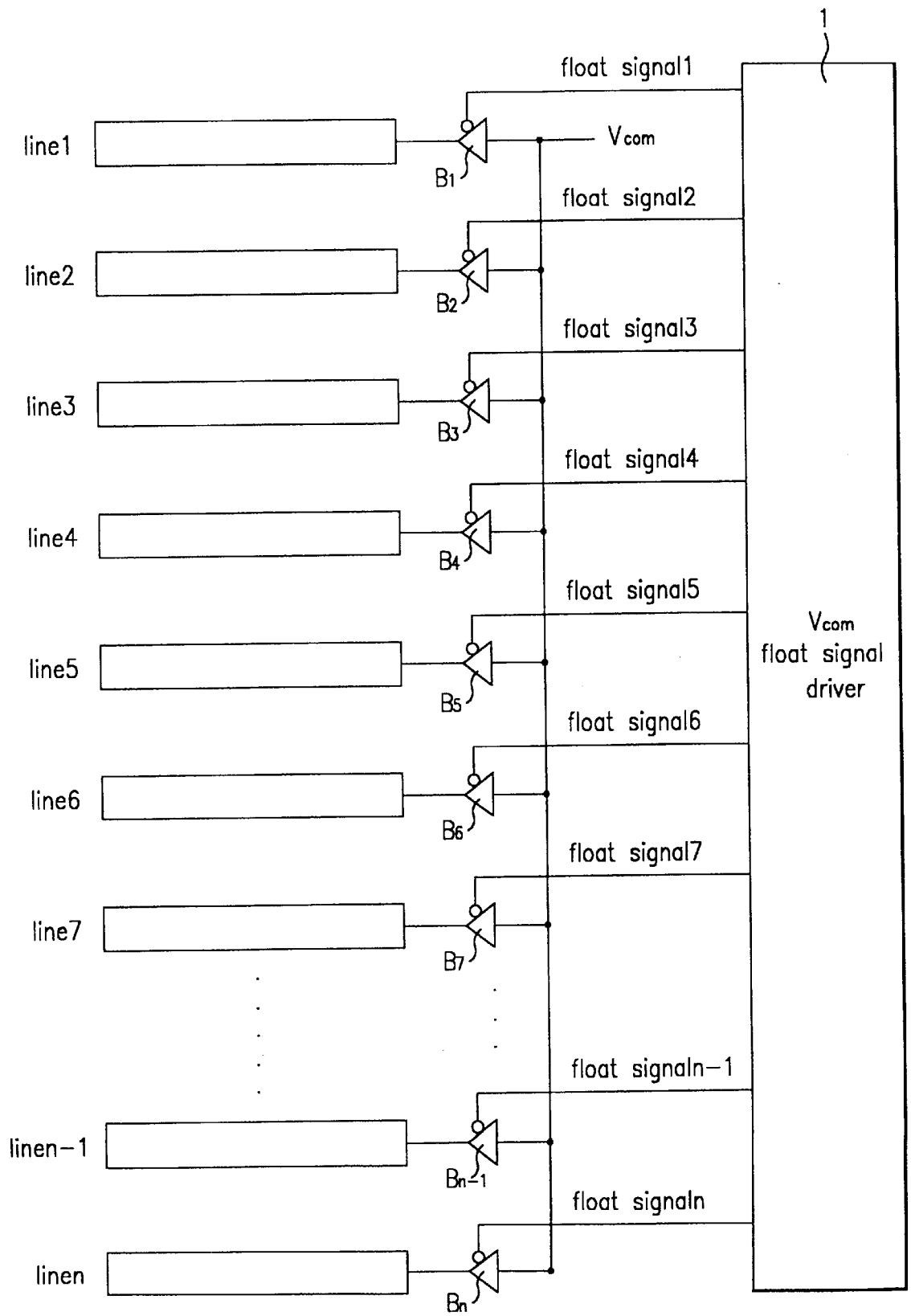
FIG. 5 shows a system of floating signal drives and switching means in accordance with a first embodiment of this invention.

FIG. 4 is a circuit diagram of a liquid crystal display in accordance with a first embodiment of this invention. FIG. 5 shows a system of floating signal drives and switching means in accordance with a first embodiment of this invention.

Figure 6:
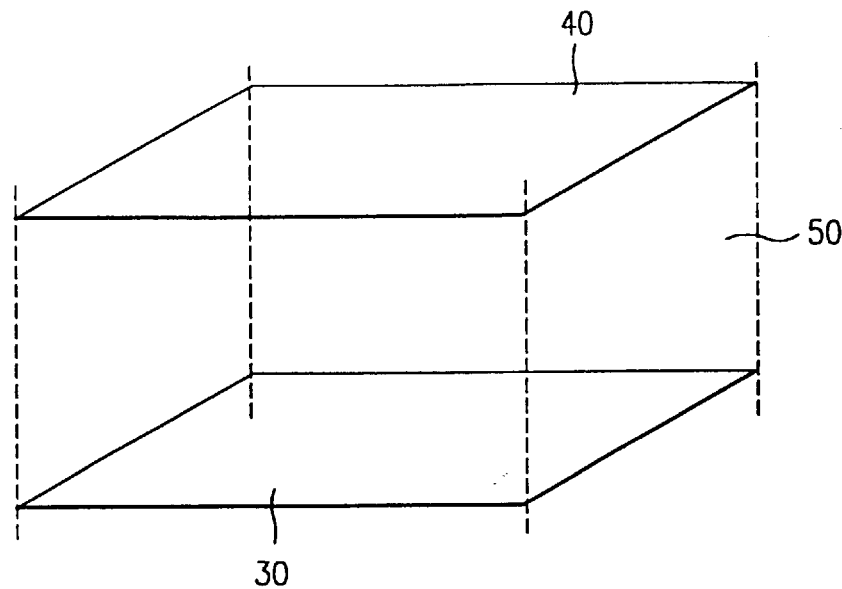
FIG. 6 is a plan view of a liquid crystal display in accordance with a first embodiment of this invention.

As shown in FIGS. 4, 5, and 6, the liquid crystal display in accordance with a first embodiment of this invention includes an underside plate 30, an upperside plate 40, and a liquid crystal material 50 disposed between the upper and lower plates 30 and 40. The underside plate 30 includes a plurality of gate lines $N_1$ to $N_n$ arranged in one direction each spaced apart from one another by a first fixed interval; a plurality of data lines $D_1$ to $D_n$ arranged in a direction vertical to the gate lines $N_1$ to $N_n$ each spaced apart from one another by a second fixed interval; and a plurality of unit pixel regions formed within space regions at respective intersections of the gate lines $N_1$ to $N_n$ and the data lines $D_1$ to $D_n$. The upperside plate 40 includes common electrodes $E_1$ to $E_n$; a plurality of tri-state buffers $B_1$ to $B_n$ each provided at each of the common electrodes $E_1$ to $E_n$; and a common voltage floating signal driver. The common electrodes $E_1$ to $E_n$ are identical to the gate lines in number, and are also formed and classified by line. The plurality of tri-state buffers $B_1$ to $B_n$ are for switching the common voltage to the common electrode. The common voltage floating signal driver is for applying floating pulses to each of the tri-state buffers $B_1$ to $B_n$.

Figure 8:
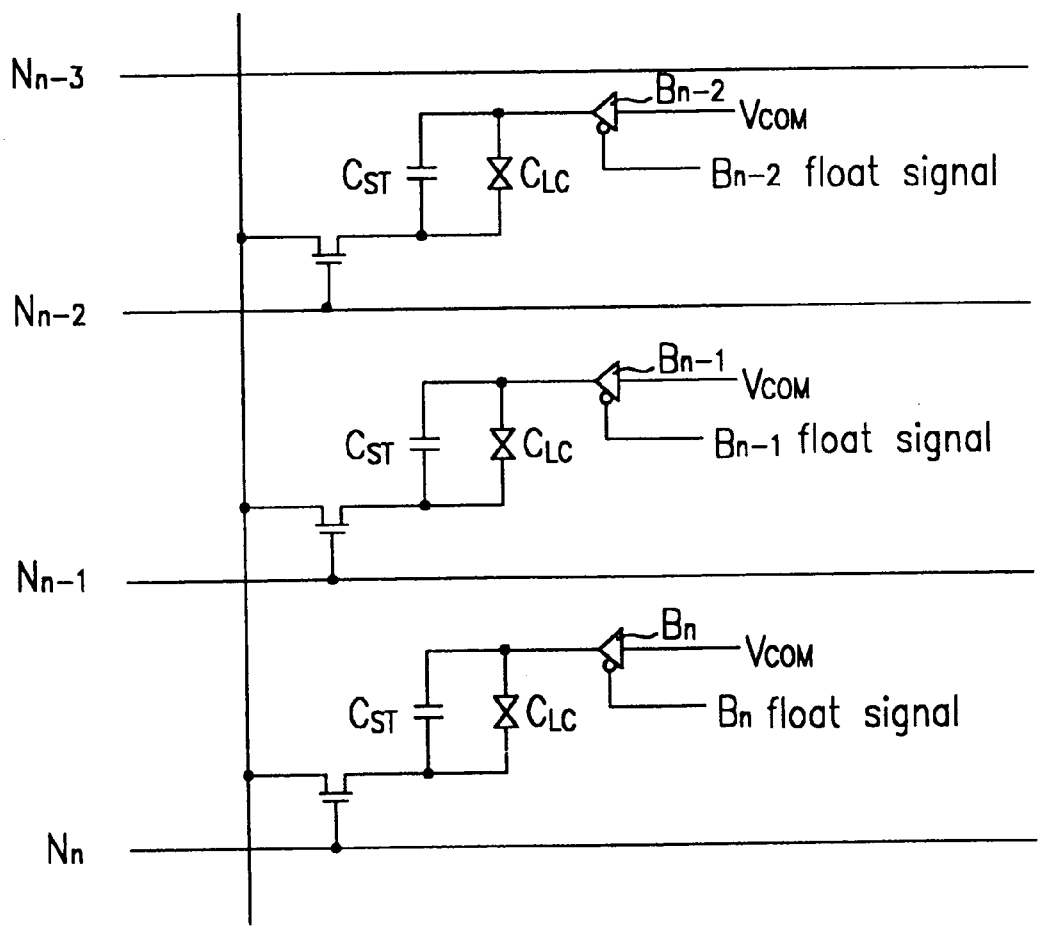
FIG. 8 is an circuit diagram of a liquid crystal display in accordance with a second embodiment of this invention.

FIG. 8 is a circuit diagram of a liquid crystal display in accordance with a second embodiment of this invention.

The liquid crystal display of the second embodiment of this invention is similar to the liquid crystal display of the first embodiment, with the addition of capacitors $C_{ST}$ formed by overlapping the common electrodes with adjacent gate lines. As with capacitors $C_{LC}$ in FIG. 4, the output of the corresponding tri-state buffer $B_1$–$B_n$ is connected to one side of a capacitor $C_{ST}$.

A method for operating the liquid crystal display in accordance with the first preferred embodiments of this invention is as follows.

Figure 7:
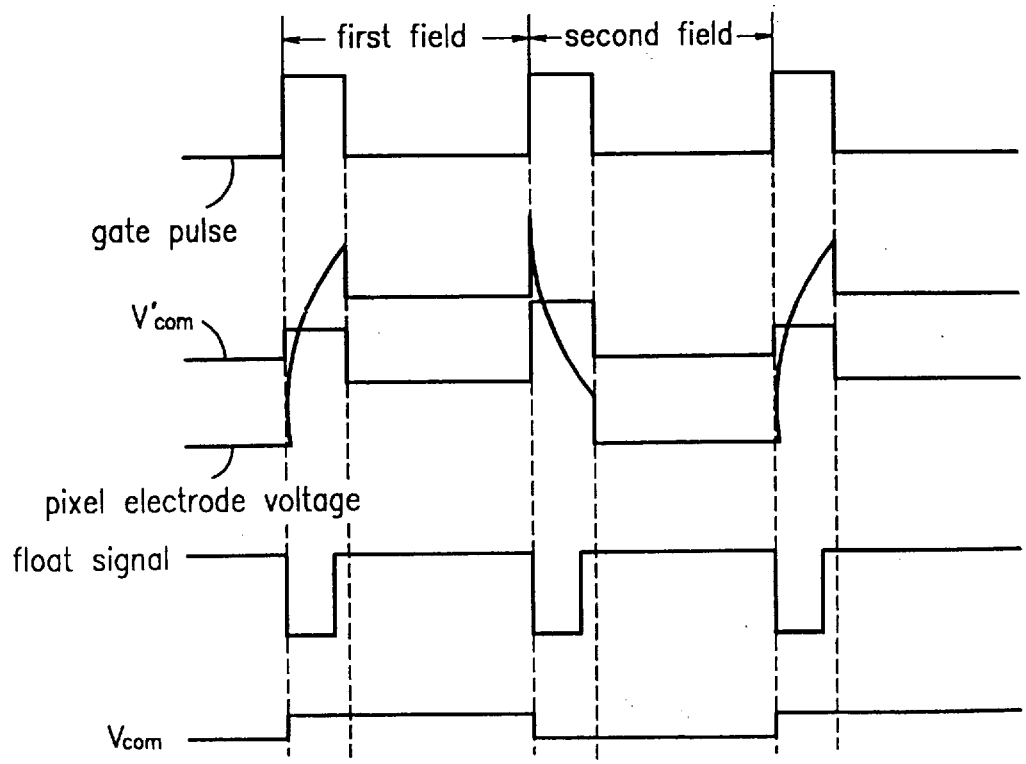
FIG. 7 shows voltage characteristic curves of a pixel electrode voltage of the liquid crystal display in accordance with a first embodiment of this invention.

FIG. 7 shows voltage characteristic curves of a pixel electrode voltage of the liquid crystal display in accordance with a first embodiment of this invention.

In this case the liquid crystal display has independent common voltage terminals, each connected to a pixel group which is obtained by dividing a panel by the number of rows in the panel. The method for operating the liquid crystal display in accordance with a first embodiment of this invention is to connect common voltage signals to the panel upperside electrodes via tri-state buffers. The tri-state buffers are turned on if the floating signal is low, and are turned off, thereby disconnecting the input from the output, if the floating signal is high.

Although in the disclosed preferred embodiment, tri-state buffers are disclosed, any component capable of performing the same function, such as a transistor, may be used in alternate embodiments.

The floating signal, which goes low when the gate pulse of respective line is high and goes high just before the gate pulse goes low, opens the common voltage terminal just before the gate pulse starts to fall. This prevents the data signal charge stored in the liquid crystal capacitor $C_{LC}$ (in the first embodiment) or $C_{ST}+C_{LC}$ (in the second embodiment) from leaking out through the parasitic capacitor $C_{gs}$ between the gate electrode and the source electrode. In this way the voltage variation $\Delta V_p$ of the pixel electrodes can be prevented.

As shown in FIG. 7, at the end of a gate pulse, the drop in the voltage $V_{COM}$, i.e., the output of the tri-state buffer, is the same as the drop in the pixel electrode voltage. Because these two voltages remain constant relative to each other after each gate pulse, there is no degradation of the image.

The liquid crystal display and the method for operating the liquid crystal display in accordance with this invention as explained above have following advantages.

First, the picture quality can be improved, since, by cutting the common voltage just before the gate pulse starts to fall, the voltage variation at both ends of the liquid crystal due to the capacitor coupling effect developed by the parasitic capacitor between the gate electrodes and the source electrodes can be prevented.

Second, the aperture ratio can be improved, since there is no necessity for forming a capacitor by overlapping the pixel electrodes and the adjacent gate lines.

The term "aperture ratio," as used in this disclosure, refers to the ratio of the aperture area, i.e., the area of the display through which light can be transmitted, divided by the total display area. Aperture ratio is a measure of the efficiency of the display.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A liquid crystal display, comprising:
    a first substrate having a plurality of gate lines, data lines, thin film transistors, and pixel electrodes arranged thereon;
    a second substrate having common electrodes formed identical in number to the gate lines and classified by line;
    a liquid crystal material provided between the first and the second substrates; and
    a plurality of switching elements connecting a common voltage source to one of said common electrodes corresponding to a gate line having a gate signal pulse applied thereto and electrically isolating said one of said common electrodes immediately prior to a falling edge of said gate signal pulse.

2. The liquid crystal display, as recited in claim 1, further comprising:
    a common voltage floating signal driver for applying floating pulses to each of the switching elements for controlling the operations of the switching elements.

3. The liquid crystal display as recited in claim 1, wherein each of the plurality of switching elements is a tri-state buffer.

4. A method for operating a liquid crystal display including a plurality of common electrodes identical in number to gate lines and classified by line, the method including the steps of:
    connecting a common voltage source to one of said common electrodes corresponding to a gate line having a gate signal pulse applied thereto; and
    electrically isolating said one of said common electrodes immediately prior to a falling edge of said gate signal pulse.

* * * * *